United States Patent
Bobbitt, III et al.

(10) Patent No.: US 7,320,006 B2
(45) Date of Patent: Jan. 15, 2008

(54) HIERARCHICAL DATABASE MANAGEMENT

(75) Inventors: Charles P. Bobbitt, III, Plano, TX (US); Jerry Hall, Frisco, TX (US)

(73) Assignee: Computer Sciences Corporation, Austin, TX (US)

( * ) Notice: Subject to any disclaimer, the term of this patent is extended or adjusted under 35 U.S.C. 154(b) by 337 days.

(21) Appl. No.: 10/987,488

(22) Filed: Nov. 12, 2004

(65) Prior Publication Data

US 2006/0106785 A1 May 18, 2006

(51) Int. Cl.
*G06F 17/30* (2006.01)

(52) U.S. Cl. .............................. 707/102; 707/3; 707/4; 707/104.1

(58) Field of Classification Search ................ 707/1–6, 707/100–102
See application file for complete search history.

(56) References Cited

U.S. PATENT DOCUMENTS

| | | | | |
|---|---|---|---|---|
| 6,732,095 B1 * | 5/2004 | Warshavsky et al. | .......... | 707/5 |
| 6,853,997 B2 * | 2/2005 | Wotring et al. | ............. | 707/100 |
| 6,985,905 B2 * | 1/2006 | Prompt et al. | ............. | 707/102 |
| 2001/0047372 A1 * | 11/2001 | Gorelik et al. | ............. | 707/514 |
| 2003/0018620 A1 * | 1/2003 | Vishnubhotla | ................. | 707/3 |
| 2004/0199524 A1 * | 10/2004 | Rys et al. | .................... | 707/100 |
| 2005/0080791 A1 * | 4/2005 | Ghatare | ..................... | 707/100 |
| 2006/0020586 A1 * | 1/2006 | Prompt et al. | ................. | 707/3 |

\* cited by examiner

*Primary Examiner*—Debbie Le
(74) *Attorney, Agent, or Firm*—Meyertons, Hood, Kivlin, Kowert & Goetzel, P.C.; Eric B. Meyertons

(57) ABSTRACT

A method for processing a request for data in a plurality of database formats is described. The method may include accepting a request for data. A format of the data request may be assessed. The assessed format may be a sequential access data format, a direct access data format, or a relational data format. If the assessed format of the data request is in the sequential access data format or the direct access data format, the data request may be translated into a relational data format. A relational database architecture may process the data request. A result to the data request may be returned. The result may be returned in the assessed format of the data request.

17 Claims, 3 Drawing Sheets

HIERARCHICAL DATABASE MANAGEMENT

BACKGROUND

1. Field of the Invention

The present invention generally relates to computer systems. In particular, embodiments relate to systems and methods for processing requests for data in a plurality of database formats.

2. Brief Description of the Related Art

Databases are used to store information within a structured environment so that the data may be organized, selected, modified, and/or extracted easily. A database may be defined as an information set with a regular structure. Databases are generally, but not necessarily, stored in a machine readable format accessible by a computer system. Databases may include simple tables with only a few files as well as very large databases with many millions of data records using several disk drives. A database management system is a collection of programs that stores, organizes, selects, modifies, and/or extracts data from a database.

There are several database models, or database formats, that are generally used. Examples of database models include, but are not limited to, hierarchical database models and relational database models. Databases may be referred to as database management systems. A hierarchical database management system links database records together in a tree data structure. Examples of hierarchical database management systems include direct access database management systems and sequential access database management systems. Direct access database management generally means that all the data can be accessed directly, by utilizing an index or a randomizing routine. Sequential access database management generally means that all data is stored in a hierarchical sequence, one segment after another. Data in a sequential access database may be accessed by sequentially seeking through the data or, in some cases, an index may be used to locate the data.

Direct access databases may be accessed by direct access database methods. Examples of direct access database methods include, but are not limited to, HDAM (hierarchic direct access method), HIDAM (hierarchic indexed direct access method), PHDAM (partitioned hierarchic direct access method), and PHIDAM (partitioned hierarchic indexed direct access method). Direct access database methods may be used to access direct access data in a file or database management system. One example of a database management system used for accessing direct access data is IMS® (Information Management System), available from IBM® Corporation (White Plains, N.Y.).

Sequential access databases may be accessed by sequential access database methods. Examples of sequential access database methods include, but are not limited to, QSAM (queued sequential access method), BSAM (basic sequential access method), OSAM (overflow sequential access method), HSAM (hierarchical sequential access method), SHSAM (simple hierarchical sequential access method), HISAM (hierarchical indexed sequential access method), SHISAM (simple hierarchical indexed sequential access method), and GSAM (generalized sequential access method). Sequential access database methods may be used to access sequential access data in a file or database management system. One example of a database management system used for accessing sequential access data is VSAM (virtual storage access method).

A relational database management system is a database model that is based on predicate logic and set theory. A fundamental assumption of a relational database is that all data may be represented as mathematical relations. A relational database may organize data into related rows and columns that are specified by a relational or logical model. A relational database management system allows a designer of the system to create a consistent relational model of the stored data. The relational model may be refined through database normalization. Examples of relational database management systems include DB2® (IBM® Corporation), Oracle® (Oracle® Corporation, Redwood Shores, Calif.), Microsoft® SQL Server (Microsoft® Corporation, Redmond, Wash.), and Microsoft® Access.

Retrieving or extracting data from each of the different format database management systems is accomplished by making a request for data from the database. Typically, a request for data is handled through a software program located on a computer system. The software program may request data from a database management system. Requests for data may be made in any of the database formats described herein. A request for data may be made in a format that is the same as a format of the database management system from which the request is being made.

In some cases, a request for data in one format may be handled by a database management system in another format. Such a request may be intercepted by a software component to translate the data request into an appropriate format for the database management system handling the request. The software component intercepting the request may also translate the response to the request back into the format of the original data request. Currently available software components are able to translate a request from a first database format and translate the request into a second database format and then return a result in the first database format. The currently available software components, however, are only able to handle a request from one particular database format and service the request in one other particular database format. The components are not able to handle a request from a variety of database formats and service the request in one particular database format.

SUMMARY

In an embodiment, a method for processing a request for data in a plurality of database formats may include accepting a request for data. The method may include assessing a format of the data request. The assessed format may be a sequential access data format, a direct access data format, or a relational data format. If the assessed format of the data request is in the sequential access data format or the direct access data format, the data request may be translated into a relational data format. The data request may be processed in a relational database architecture. A result to the data request may be returned in the assessed format of the data request.

In certain embodiments, a method for processing a request for data in a plurality of database formats may include assessing a format of a data request. The assessed format may be a sequential access data format, a direct access data format, or a relational data format. The data request may be processed in a relational database architecture regardless of the assessed format of the data request. A result to the data request may be returned in the assessed format of the data request.

In some embodiments, a method for processing a request for data in a plurality of database formats may include assessing a request for data in a hierarchical data format. The method may include processing the request for data in a relational database architecture. The method may return a hierarchical result to the request for data.

In an embodiment, a method for processing a request for data in a plurality of database formats may be executable in an input/output software module. The software module may assess a format of the data request from the front end software program. The assessed format may be a sequential access data format, a direct access data format, or a relational data format. The software module may send the data request to a relational database management system. The relational database management system may process the data request regardless of the assessed format of the data request. The software module may accept a result to the data request from the relational database management system. The software module may send the result to the data request to the front end software program. The result may be in the assessed format of the data request.

BRIEF DESCRIPTION OF THE DRAWINGS

Features and advantages of the methods and apparatus of the present invention will be more fully appreciated by reference to the following detailed description of presently preferred but nonetheless illustrative embodiments in accordance with the present invention when taken in conjunction with the accompanying drawings in which.

Figure 1:
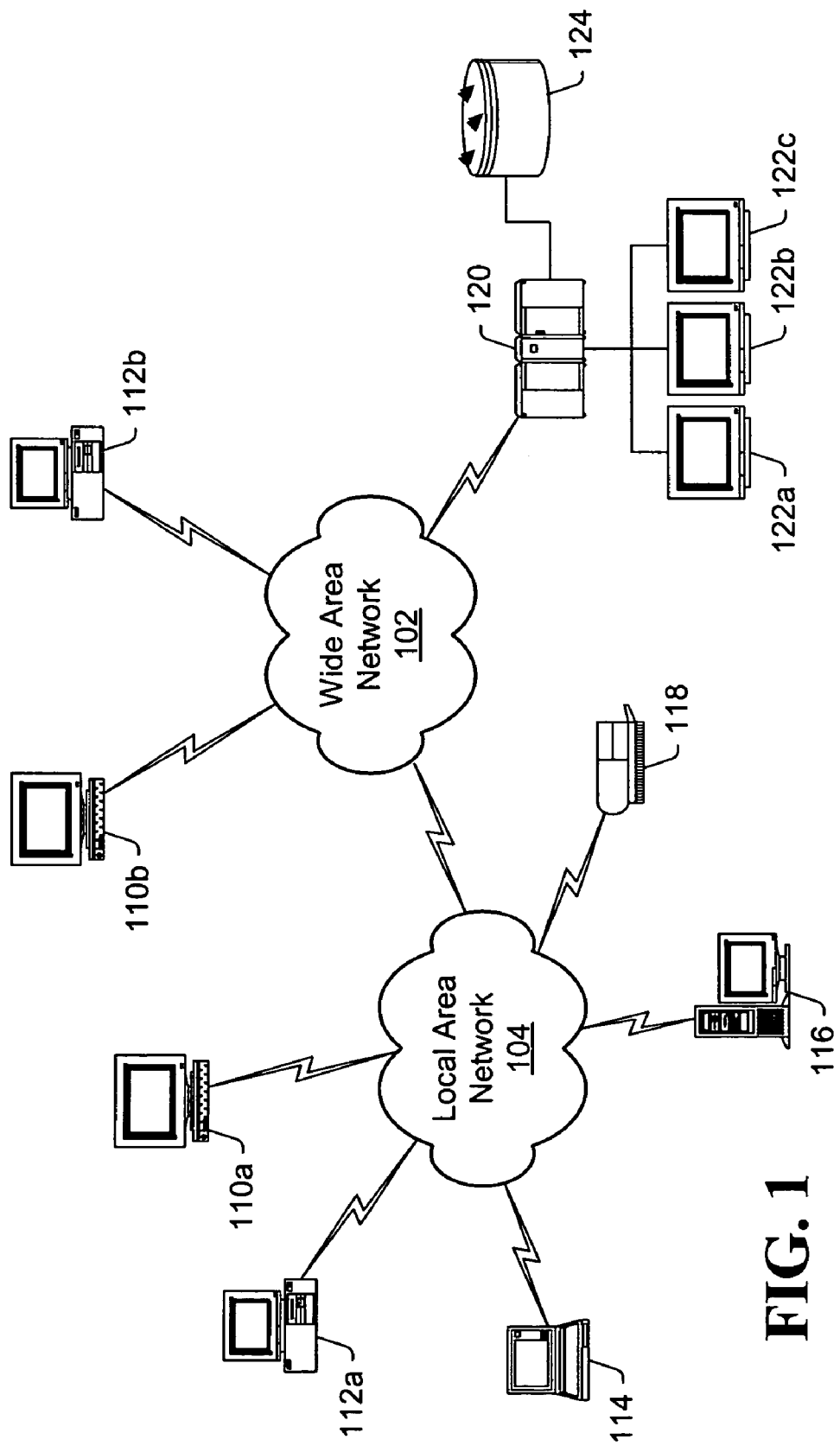
FIG. 1 illustrates an embodiment of a wide area network ("WAN") for use with various embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION

In certain embodiments, a database may be accessed over a variety of networks. For example, a database may be accessed over a wide area network ("WAN") or a local area network ("LAN"). A database may be located at a central location and accessed over a WAN or a LAN. A user may access (e.g., send data for storage or make requests for data retrieval) from a computer system (e.g., a personal computer or a workstation). The computer system may include software or other media for allowing a user to communicate with a database. In some embodiments, the software or other media may be located remotely from the computer system (e.g., the software may be located on a mainframe computer system connected to the user's computer system through a LAN or a WAN).

FIG. 1 illustrates an embodiment of a wide area network ("WAN") and a local area network ("LAN"). WAN 102 may be a network that spans a relatively large geographical area. The Internet is an example of WAN 102. WAN 102 may be a virtual private network ("VPN") or other secure communication network. WAN 102 typically includes a plurality of computer systems that may be interconnected through one or more networks. Although one particular configuration is shown in FIG. 1, WAN 102 may include a variety of heterogeneous computer systems and networks that may be interconnected in a variety of ways and that may run a variety of software applications.

One or more LANs 104 may be coupled to WAN 102. LAN 104 may be a network that spans a relatively small area. Typically, LAN 104 may be confined to a single office (e.g., a bank office), multiple offices (e.g., several bank offices in a local area), a single building (e.g., a corporate building), or a group of buildings (e.g., a corporate campus). Each node (i.e., individual computer system or device) on LAN 104 may have its own CPU with which it may execute programs, and each node may also be able to access data and devices anywhere on LAN 104. LAN 104, thus, may allow many users to share devices (e.g., printers) and data stored on file servers. LAN 104 may be characterized by a variety of types of topology (i.e., the geometric arrangement of devices on the network), of protocols (i.e., the rules and encoding specifications for sending data, and whether the network uses a peer-to-peer or user/server architecture), and of media (e.g., twisted-pair wire, coaxial cables, fiber optic cables, and/or radio waves).

Each LAN 104 may include a plurality of interconnected computer systems and optionally one or more other devices such as one or more workstations 110a, one or more personal computers 112a, one or more laptop or notebook computer systems 114, one or more server computer systems 116, and one or more network printers 118. As illustrated in FIG. 1, an example LAN 104 may include one of each computer systems 110a, 112a, 114, and 116, and one printer 118. LAN 104 may be coupled to other computer systems and/or other devices and/or other LANs 104 through WAN 102.

One or more mainframe computer systems 120 may be coupled to WAN 102. As shown, mainframe 120 may be coupled to storage device 124 and mainframe terminals 122a, 122b, and 122c. In some embodiments, storage device 124 may include or be a file server. Mainframe 120 may include software or other services that are operable over WAN 102 and/or LAN 104. For example, software on mainframe 120 may be useable at workstation 110a and/or personal computer 112a. In certain embodiments, mainframe 120 and/or storage device 124 may include a teleprocessing monitor, an operating system, a database management system, and/or a networking facility. In some embodiments, mainframe 120 and/or storage device 124 may include other software services, file services, and/or storage facilities. In certain embodiments, mainframe 120 and/or storage device 124 may include software or other control means for controlling access to the mainframe and/or the storage device.

Mainframe terminals 122a, 122b, and 122c may be coupled to or included in mainframe computer system 120. Mainframe terminals 122a, 122b, and 122c may access data found in storage device 124. In certain embodiments, computer systems (e.g., workstation 110a or personal computer 112a) may access data stored in storage device 124. WAN 102 may also include computer systems connected to WAN 102 individually and not through LAN 104 for purposes of example, workstation 110b and personal computer 112b. For example, WAN 102 may include computer systems that may be geographically remote and connected to each other through the Internet.

In some embodiments, one or more mainframe computer systems may be coupled to LAN 104 without use of WAN 102. This may provide a more secure network for movement of data between a mainframe computer system and one or more computer systems on LAN 104 (e.g., workstation 110a or personal computer 112a). In some embodiments, a mainframe computer system coupled within LAN 104 may be allowed, under certain conditions, to communicate with WAN 102. Certain conditions may include, for example, a secure connection between LAN 104 and WAN 102.

Figure 2:
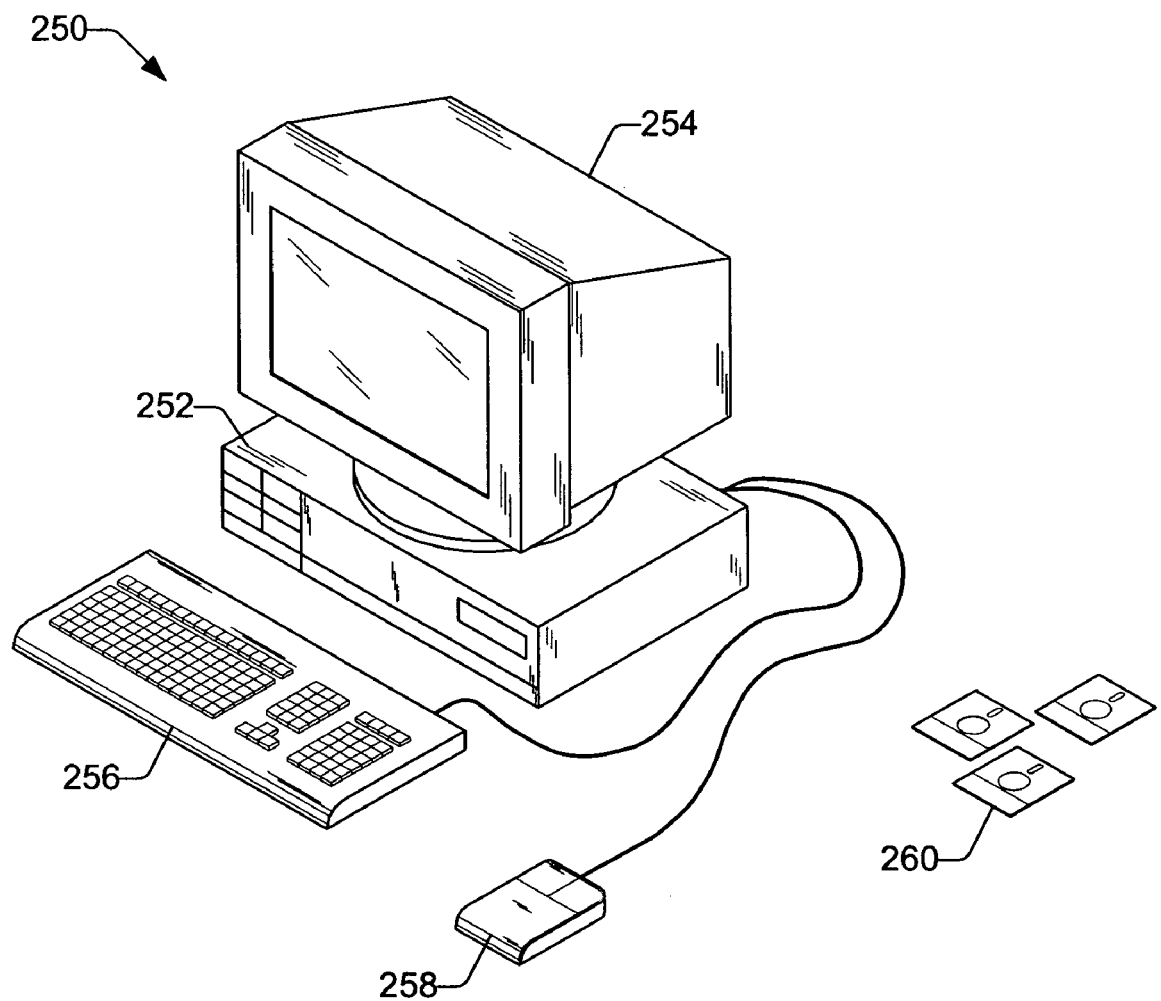
FIG. 2 illustrates an embodiment of computer system that may be suitable for implementing various embodiments.

FIG. 2 illustrates an embodiment of computer system 250 that may be suitable for implementing various embodiments. Each computer system 250 typically includes components such as CPU 252 with associated storage medium 260. Storage medium 260 may be, for example, floppy disks, CD-ROMs, DVD-ROMs, or memory sticks. Storage medium 260 may store program instructions for computer programs. Program instructions may be transferable from storage medium 260 to CPU 252 (e.g., to a memory medium on CPU 252). Program instructions may be executable by CPU 252. Computer system 250 may further include a display device such as monitor 254, an alphanumeric input device such as keyboard 256, and a directional input device such as mouse 258. Computer system 250 may be operable to execute the computer programs to implement computer-implemented systems and methods.

Computer system 250 may include a memory medium on which computer programs according to various embodiments may be stored. The term "memory medium" is intended to include an installation medium (e.g., storage medium 260), a computer system memory such as DRAM, SRAM, EDO RAM, Rambus RAM, etc., or a non-volatile memory such as a magnetic media, e.g., a hard drive or optical storage. The memory medium may also include other types of memory or combinations thereof. In addition, the memory medium may be located in a first computer, which executes the programs or may be located in a second different computer, which connects to the first computer over a network. In the latter instance, the second computer may provide the program instructions to the first computer for execution. Computer system 250 may take various forms such as a personal computer system, mainframe computer system, workstation, network appliance, Internet appliance, personal digital assistant ("PDA"), television system, or other device. In general, the term "computer system" may refer to any device having a processor that executes instructions from a memory medium.

The memory medium may store a software program or programs operable to implement a method (e.g., a method for accessing data from a database). The software program (s) may be implemented in various ways, including, but not limited to, procedure-based techniques, component-based techniques, and/or object-oriented techniques, among others. For example, the software programs may be implemented using ActiveX controls, C++ objects, JavaBeans, Microsoft Foundation Classes ("MFC"), browser-based applications (e.g., Java applets), traditional programs, or other technologies or methodologies, as desired. A CPU such as host CPU 252 executing code and data from the memory medium may include a means for creating and executing the software program or programs according to the embodiments described herein.

Figure 3:
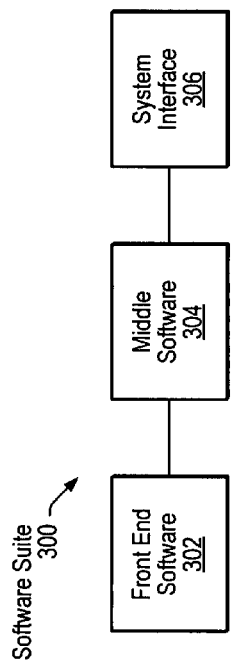
FIG. 3 depicts an embodiment of a software suite.

FIG. 3 depicts an embodiment of a software suite. Software suite 300 may include one or more software programs. The software programs may be interrelated such that the software programs are able to communicate with each other directly or through one or more related software programs.

Software programs in software suite 300 may be located (e.g., stored) on one or more computer systems (e.g., workstation 110a, personal computer 112a, mainframe 120, and/or CPU 252, depicted in FIGS. 1 and 2). In some embodiments, a software program may be located on one computer system and executed on another computer system. For example, a software program may be located on a mainframe computer system but the software may be temporarily located and executed on a workstation or remote terminal. In some embodiments, a software program may be located and executed on one computer system (e.g., a mainframe computer system) but the results may be reported on another computer system (e.g., a workstation or computer terminal interconnected to the mainframe computer system).

Software suite 300, as depicted in FIG. 3, may include front end software 302, middle software 304, and system software 306. In certain embodiments, software suite 300 may be obtainable as a single software program that includes front end software 302, middle software 304, and system software 306. In some embodiments, software suite 300 may include one or more software components that are obtained individually but are interrelated such that the software components are useable in combination. Software suite 300 may allow for inclusion of additional software programs (i.e., "add-on software") based on a client's or a user's requirements. In certain embodiments, software suite 300 may perform one or more functions. These functions may include, but not be limited to, processing requests for data retrieval, processing requests for data storage, performing search functions, processing links to other software suites, and sending/receiving messages.

Front end software 302 may be software that directly interacts with a user (e.g., an end user). For example, front end software 302 may include user-oriented or client software applications that are user specific and/or user friendly. In certain embodiments, front end software 302 may allow a user to request real services from a computer system. These services may include, but not be limited to, requesting data (e.g., requesting information from a database), requesting storage of data, requesting links to other programs, and/or sending/receiving of messages.

In some embodiments, front end software 302 may include a plurality of software programs (e.g., a suite of software programs that perform interrelated services). In certain embodiments, front end software 302 may include a financial or banking software program. In some embodiments, front end software 302 may be included as a part of a financial or banking software program.

One example of an available banking software program is Hogan® available from Computer Sciences Corporation (CSC), Inc., (El Segundo, Calif.). Hogan® allows a client or user to request banking data, request storage of banking data, request links to other programs, and/or send/receive messages in a banking environment. Hogan® or another similar software program may include front end software 302, middle software 304, and/or system software 306.

System software 306 may include general software used to operate computer systems, store information, and/or perform computer related services. System software 306 may include software that operates in a logical, computational, or data movement environment. In some embodiments, system software 306 may logically or computationally apply business rules to service or data requests. Examples of system software may include, but not be limited to, operating systems, teleprocessing monitors, database managements systems, and/or networking facilities. In some embodiments, system software 306 may support or include more than one database management system format. For example, system software 306 may support or include a sequential access database format, a direct access database format, and a relational database format. In certain embodiments, system software 306 may be located on a mainframe computer system (e.g., mainframe 120 depicted in FIG. 1).

As shown in FIG. 3, middle software 304 may integrate between front end software 302 and system software 306. One example of middle software 304 commercially available is Hogan's Umbrella System® available from CSC, Inc. In certain embodiments, middle software 304 may assist in communication between front end software 302 and system software 306. Middle software 304 may assist in communication by translating service requests between front end software 302 and system software 306.

In certain embodiments, middle software 304 may be a logical environment that insulates the logical or computational environment of system software 306 from real service requests made by a user using front end software 302. For example, middle software 304 may perform services (e.g., service requests) on behalf of front end software 302 and/or manage service workflow external to the front end software (i.e., the middle software selects, utilizes, and communicates with the proper system software so that the front end software is not responsible for these tasks). In an embodiment, middle software 304 may translate a service request from front end software 302 into a format (e.g., logical) understood by system software 306 and then return a response to the service request from the system software into a format understood by the front end software.

In certain embodiments, middle software 304 may allow for centralization of processing functions (e.g., database management services) performed by system software 306 and used by front end software 302. This centralization may reduce redundancy in software by allowing several front end softwares 302 to interact with one centralized middle software 304 and one centralized system software 306. Reducing software redundancy may allow for more efficient operation of front end softwares 302 and reduce maintenance costs associated with middle software 304 and/or system software 306.

Centralization of middle software 304 and system software 306 may allow for better response to changes in business models, technical processes, and/or structural processes by reducing a number of software systems that need to be adjusted to respond to a change. Centralization of middle software 304 and system software 306 may allow for updates, changes, and/or servicing in front end software 302 by, for example, a user or client without needing to incorporate changes in the middle software and/or the system software.

In some embodiments, middle software 304 may improve performance of services between front end software 302 and system software 306. For example, middle software 304 may reduce the number of accesses to system software 306 (e.g., a database management program in the system software) by front end software 302 by caching high-use data in the memory of the middle software to reduce the response time in accessing the high-use data. In another example, middle software 304 may allow multi-streaming of batch processes requested by front end software 302 so that large volumes of data may be processed in batch windows (e.g., nightly batch windows).

In certain embodiments, middle software 304 may allow for an open software programming architecture. Middle software 304 may allow front end software 302 to operate independent of any specific software platform used in system software 306. Having front end software 302 independent of a software platform used in system software 306 allows for front end software 302 to be compatible with a variety of programming environments.

In certain embodiments, middle software 304 may allow for implementation of modular components (e.g., modular software components) into software suite 300. A modular component may be implemented within front end software 302, middle software 304, or system software 306. In some embodiments, a modular component may be implemented between software components (e.g., between front end software 302 and middle software 304 or between middle software 304 and system software 306). For example, as depicted in FIG. 3, module 308 may be implemented between middle software 304 and system software 306.

Figure 4:
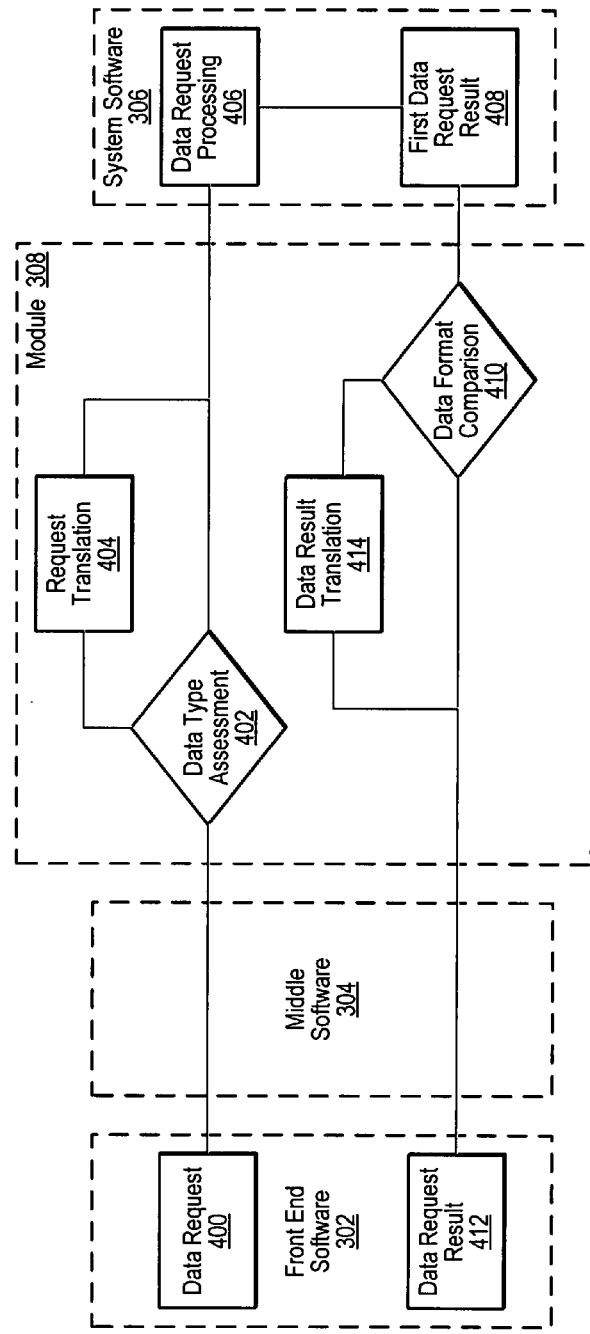
FIG. 4 depicts a flowchart for an embodiment of a module that may be implemented between software components in a software suite.

FIG. 4 depicts a flowchart for an embodiment for requesting database data in a software suite (e.g., software suite 300 depicted in FIG. 3). In certain embodiments, module 308 may be an input/output module. Module 308 may be a software module. Module 308 may include one or more layers of logic. For example, module 308 may include a plurality of logical steps that are performed between software components (e.g., between middle software 304 and system software 306, as shown in FIGS. 3 and 4). In certain embodiments, module 308 may perform one or more functions related to certain software components (e.g., front end software, middle software, and/or system software). Functions performed by module 308 may include, but not be limited to, data requests (i.e., data storage or retrieval), assessment of data requests, assessment of data request formats, translation of data requests, and translation of data request responses.

In an embodiment, module 308 may include a module that processes requests for data from one or more databases. As shown in FIG. 4, data request 400 may be input into module 308. Data request 400 may be a request for data from a database management system. Data request 400 may be a request originating in, for example, front end software 302. In certain embodiments, data request 400 may originate in front end software 302 and pass through middle software 304 before entering module 308, as shown in FIG. 4.

A database management system may be located, for example, in system software 306, shown in FIGS. 3 and 4. Data request 400, shown in FIG. 4, may be in a selected format. The selected format of a data request may be determined, for example, by front end software 302. For example, front end software 302 may use a selected format of data so that any request from the front end software is made in the selected format of data. In some embodiments, the selected format of a data request may be determined by middle software 304. For example, middle software 304 may translate a format of a data request originating in front end software 302.

In some embodiments, data request 400 may be a request for data in a hierarchical access data format (i.e., a hierarchical access data request). Hierarchical access data requests may include data requests from hierarchical databases. Hierarchical databases may include, but not be limited to, sequential access databases and direct access databases. Thus, hierarchical access data requests may include sequential access data requests or direct access data requests.

Sequential access databases may be accessed by sequential access database methods. A sequential access database method may be, but not be limited to, QSAM, BSAM, OSAM, HSAM, SHSAM, HISAM, SHISAM, or GSAM. Sequential access database methods may be used to access sequential access data in a file or database management system. One example of a database management system used for accessing sequential access data is VSAM.

Direct access databases may be accessed by direct access database methods. A direct access database method may be, but not be limited to, HDAM, HIDAM, PHDAM, or PHIDAM. Direct access database methods may be used to access direct access data in a file or database management system. One example of a database management system used for accessing direct access data is IMS®.

In some embodiments, data request 400 may be a request for data in a relational data format (i.e., a relational data request). Relational data requests may include data requests from relational databases. In an embodiment, a database management system that accesses relational data may be DB2®.

As shown in FIG. 4, module 308 may include data format assessment 402. Data type assessment 402 may include assessing a format of data requested in data request 400. For example, data format assessment 402 may assess if data request 400 is either a sequential access data request (e.g., a VSAM request), a direct access data request (e.g., an IMS® request), or a relational data request (e.g., a DB2® request). In certain embodiments, software suite 300 may include support for a plurality of data formats. For example, software suite 300 may include support for sequential access data, direct access data, and relational data.

In an embodiment, if data request 400 is assessed to be a relational data request, module 308 sends the data request directly to data request processing 406. If data request 400 is assessed as either a sequential access data request or a direct access data request (i.e., the data request is a hierarchical access data request). Module 308 sends the data request to request translation 404. Request translation 404 may translate a hierarchical data request into a relational data request. Module 308 then may send the translated data request to data request processing 406.

Data request processing 406 may be performed in system software 306. System software 306 may include a database management system to process the data request. In an embodiment, system software 306 includes a relational database management system (e.g., DB2®) to process the data request in a relational database architecture. Thus, data request 400 may be processed in a relational database architecture regardless of the format of the data request. Having data stored in a relational database management system may allow for data to be accessed by a greater number of types of front end software 302. A relational database management system may allow for more flexible modification of the data, easier modification of database criteria, and/or a greater availability of the data (e.g., the data may be available 24 hours a day, 7 days a week unlike some other types of database management systems).

Data request processing 406 may produce first data request result 408. In an embodiment, first data result is in a relational data format. First data request result 408 may be sent to module 308. Module 308 may include data format comparison 410. Data format comparison 410 may compare a format of first data request result 408 to a format of data request 400 assessed by data format assessment 402.

If the format of first data request result 408 is substantially the same as the format of data request 400 (e.g., the first data request result and the data request are both in relational data format), then the first data request result may be output as data request result 412 directly to middle software 304 and/or front end software 302.

If the format of first data request result 408 is different than the format of data request 400 (e.g., the first data request result is in relational data format and the data request is in hierarchical access data format, either sequential access data format or direct access data format), then data format comparison 410 may send the first data request result to data result translation 414. Data result translation 414 may translate first data request result 408 into a format that is substantially the same as the format of data request 400 and output the result as data request result 412.

Thus, module 308 may allow for processing of data request 400 in a relational database architecture regardless of a format of the data request. Module 308 may also output data request result 412 in the proper format according to data request 400 after processing the data request in a relational database architecture. In some embodiments, module 308 may allow a user to easily switch between different data formats to compare results obtained using the different data formats. For example, a user may switch from a sequential access data format to a relational data format using front end software 302 to compare the obtained results.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method for responding to requests for data in a plurality of database formats received from one or more clients, comprising:

accepting three or more requests for data, wherein one or more of the data requests is in a sequential access data format, one or more of the data requests is in a direct access data format, and one or more of the data requests is in relational data format; and for each of the accepted data requests:

assessing a format of the data request, wherein the assessed format comprises a sequential access data format, a direct access data format, or a relational data format, if the assessed format is the sequential access data format or the direct access data format, translating the data request into the relational data format and sending the translated data request for data request processing;

if the assessed format is the relational data format, sending the data request directly for data request processing;

processing the data request in a relational database architecture to produce a first data request result, wherein the data request is processed regardless of the assessed format of the data request;

if the assessed format is the sequential access data format or the direct access data format, translating the first data request result from the relational data format to the assessed format of the data request; and returning a second data request result to the data request to one or more of the clients, wherein the second data request result is returned in the assessed format of the data request, wherein if the assessed format is the sequential access data format or the direct access data format, the second data request result is the translated first data request result, wherein if the assessed format is the relational data format, the second data request result is the same as the first data request result.

2. The method of claim 1, wherein the requests are accepted from a front end software program.

3. The method of claim 1, wherein the second data request results are returned to a front end software program.

4. The method of claim 1, wherein the request for data comprises a financial data request.

5. The method of claim 1, wherein one or more of the data requests in the sequential access data format are received from a first client, one or more of the data requests in a direct access data format are received from a second client, and one or more of the data requests in relational data format are received from a third client.

6. The method of claim 1, wherein one or more of the data requests in the sequential access data format are received from a first front end software program, one or more of the data requests in a direct access data format are received from a second front end software program, and one or more of the data requests in relational data format are received from a third front end software program.

7. The method of claim 6, wherein one or more of the data requests in the sequential access data format are received from a first client, one or more of the data requests is in a direct access data format are received from a second client, and one or more of the data requests is in relational data format are received from a third client.

8. The method of claim 6, wherein the one or more of the data requests are accepted and translated in a middleware program.

9. The method of claim 6, wherein the accepting, assessing, and translating the data requests is centralized in a middleware program.

10. The method of claim 6, wherein the accepting, assessing, and translating the data requests is centralized in a middleware program, wherein the processing of the data requests is centralized in a system software program.

11. The method of claim 6, wherein one or more of the data requests are accepted and translated in an input/output module coupled to a middleware program and relational database management system.

12. A system, comprising:
a CPU;
a data memory coupled to the CPU; and
a system memory coupled to the CPU, wherein the system memory is configured to store one or more computer programs executable by the CPU, and wherein the computer programs are executable to implement a method for responding to requests for data in a plurality of database formats received from one or more clients, the method comprising:
accepting three or more requests for data, wherein one or more of the data requests is in a sequential access data format, one or more of the data requests is in a direct access data format, and one or more of the data requests is in relational data format; and
for each of the accepted data requests:
assessing a format of the data request, wherein the assessed format comprises a sequential access data format, a direct access data format, or a relational data format,
if the assessed format is the sequential access data format or the direct access data format, translating the data request into the relational data format and sending the translated data request for data request processing;
if the assessed format is the relational data format, sending the data request directly for data request processing;
processing the data request in a relational database architecture to produce a first data request result, wherein the data request is processed regardless of the assessed format of the data request;
if the assessed format is the sequential access data format or the direct access data format, translating the first data request result from the relational data format to the assessed format of the data request; and
returning a second data request result to the data request to one or more of the clients, wherein the result is returned in the assessed format of the data request, wherein if the assessed format is the sequential access data format or the direct access data format, the second data request result is the translated first data request result, wherein if the assessed format is the relational data format, the second data request result is the same as the first data request result.

13. The system of claim 12, further comprising a middleware program, wherein the computer programs are executable to implement a method for responding to requests for data in a plurality of database formats received from one or more clients accepting and translating data requests are in the middleware program.

14. A method for providing responses to data requests made in a plurality of database formats from two or more clients, comprising:
accepting two or more requests for data made from two or more clients, wherein one or more of the data requests made from at least one of the clients is in a sequential access data format and one or more of the data requests from at least one other of the clients is in a direct access data format; and
for each of the accepted data requests:
assessing a format of the data request, wherein the assessed format comprises a sequential access data format or a direct access data format;
translating the data request, according to the assessed format, into a relational data format and sending the translated data request for data request processing;
processing the data request in a relational database architecture to produce a first data request result, wherein the data request is processed regardless of the assessed format of the data request;
translating the first data request result from the relational data format to the assessed format of the data request; and
returning a second data request result to the data request to one or more of the clients, wherein the result is returned in the assessed format of the data request, wherein the second data request result is the translated first data request result.

15. A system, comprising:
a CPU;
a data memory coupled to the CPU; and
a system memory coupled to the CPU, wherein the system memory is configured to store one or more computer programs executable by the CPU, and wherein the computer programs are executable to implement a method for responding to requests for data in a plurality of database formats received from two or more clients, the method comprising:

accepting two or more requests for data made from two or more clients, wherein one or more of the data requests made from at least one of the clients is in a sequential access data format and one or more of the data requests from at least one other of the clients is in a direct access data format; and for each of the accepted data requests:

assessing a format of the data request, wherein the assessed format comprises a sequential access data format or a direct access data format;

translating the data request, according to the assessed format, into a relational data format and sending the translated data request for data request processing;

processing the data request in a relational database architecture to produce a first data request result, wherein the data request is processed regardless of the assessed format of the data request;

translating the first data request result from the relational data format to the assessed format of the data request; and returning a second data request result to the data request to one or more of the clients, wherein the result is returned in the assessed format of the data request, wherein the second data request result is the translated first data request result.

16. A method for responding to requests for data in a plurality of database formats received from one or more clients, comprising:

accepting two or more requests for data made from two or more clients, wherein one or more of the data requests made from at least one of the clients is in a hierarchical data format and one or more of the data requests from at least one other of the clients is in a relational data format; and for each of the accepted data requests:

assessing a format of the data request, wherein the assessed format comprises a sequential access data format, a direct access data format, or a relational data format,:

if the assessed format is the sequential access data format or the direct access data format, translating the data request into the relational data format and sending the translated data request for data request processing;

if the assessed format is the relational data format, sending the data request directly for data request processing;

processing the data request in a relational database architecture to produce a first data request result, wherein the data request is processed regardless of the assessed format of the data request;

if the assessed format is the sequential access data format or the direct access data format, translating the first data request result from the relational data format to the assessed format of the data request; and returning a second data request result to the data request to one or more of the clients, wherein the result is returned in the assessed format of the data request, wherein if the assessed format is the sequential access data format or the direct access data format, the second data request result is the translated first data request result, wherein if the assessed format is the relational data format, the second data request result is the same as the first data request result.

17. A system, comprising:

a CPU;

a data memory coupled to the CPU; and a system memory coupled to the CPU, wherein the system memory is configured to store one or more computer programs executable by the CPU, and wherein the computer programs are executable to implement a method for responding to requests for data in a plurality of database formats received from two or more clients, the method comprising:

accepting two or more requests for data made from two or more clients, wherein one or more of the data requests made from at least one of the clients is in a hierarchical data format and one or more of the data requests from at least one other of the clients is in a relational data format; and for each of the accepted data requests:

assessing a format of the data request, wherein the assessed format comprises a sequential access data format, a direct access data format, or a relational data format, if the assessed format is the sequential access data format or the direct access data format, translating the data request into the relational data format and sending the translated data request for data request processing;

if the assessed format is the relational data format, sending the data request directly for data request processing;

processing the data request in a relational database architecture to produce a first data request result;

if the assessed format is the sequential access data format or the direct access data format, translating the first data request result from the relational data format to the assessed format of the data request; and returning a second data request result to the data request to one or more of the clients, wherein the result is returned in the assessed format of the data request, wherein if the assessed format is the sequential access data format or the direct access data format, the second data request result is the translated first data request result, wherein if the assessed format is the relational data format, the second data request result is the same as the first data request result.

* * * * *